United States Patent [19]

Soederhuyzen

[11] Patent Number: 4,547,005
[45] Date of Patent: Oct. 15, 1985

[54] CONNECTING PIPE PART OF A RESILIENT MATERIAL

[76] Inventor: Eduard Soederhuyzen, 330 Staalmeesterslaan, 1057 PC Amsterdam, Netherlands

[21] Appl. No.: 406,866

[22] Filed: Aug. 10, 1982

[30] Foreign Application Priority Data

Aug. 17, 1982 [NL] Netherlands .......................... 8103780

[51] Int. Cl.$^4$ ............................................. F16L 55/00
[52] U.S. Cl. ..................................... 285/58; 285/110; 285/237; 285/423
[58] Field of Search ...................... 285/56, 57, 237, 58, 285/110, 423, 111

[56] References Cited

U.S. PATENT DOCUMENTS 3,913,928 10/1975 Yamaguchi ..................... 285/110 X

FOREIGN PATENT DOCUMENTS

| 1185431 | 1/1965 | Fed. Rep. of Germany ...... 285/110 |
| 157094 | 6/1978 | Netherlands ......................... 285/237 |
| 589246 | 6/1977 | Switzerland ......................... 285/110 |
| 1260263 | 1/1972 | United Kingdom ................ 285/110 |
| 1444078 | 7/1976 | United Kingdom ................ 285/237 |
| 2012902 | 8/1979 | United Kingdom ................ 285/237 |

Primary Examiner—Dave W. Arola
Attorney, Agent, or Firm—Stephen E. Feldman; Nikolay Parada

[57] ABSTRACT

A connecting pipe part of a resilient material for connecting a closet bowl to a drain conduit comprises on one end a female part for receiving an outlet of a closet bowl and on the other end a male part to be received into a drain pipe or conduit, while a sealing sleeve connected with the female part extends within the female part.

Said sealing sleeve merges through a discontinuously thinned transition. Into the female part, the thickness of the sleeve being thinner than the thickness of the female part.

The transition is preferably located halfway in a plane parallel to the inner wall of the female part, said plane being located midway between the inner side of the female part and the extension of the inner side of the male part.

End part support members extend in the direction of the male part. Preferably the end parts 12 are thinner than the remaining parts and extend parallel to the inner wall of the female part, while the remaining parts 13 of the support members extend radially in relation to the female part.

5 Claims, 4 Drawing Figures

CONNECTING PIPE PART OF A RESILIENT MATERIAL

BACKGROUND OF THE INVENTION

1. Field of the Invention

This invention relates to a connecting pipe part of a resilient material adapted to connect a closet bowl to a drain conduit and comprising on one end a female part for receiving an outlet of a closet bowl and on the other end a male part adapted to be received into a drain pipe or conduit, a sealing sleeve connected with the female part extending within the female part, the inner side of the female part being whether or not provided with flexible support members which can extend substantially to the sealing sleeve.

2. Description of the Prior Art

Such a connecting pipe part made with flexible support members of a resilient material is used in the art and this pipe part has several drawbacks.

Firstly, the rather thick sealing sleeve merges gradually into the female part, thus rendering the insertion of a closet bowl outlet sometimes difficult. When inserting the outlet of a closet bowl, the sealing sleeve may, moreover, easily become too long locally, thus providing inadequate sealing.

On the other hand, penetration of the closet bowl outlet into the sealing sleeve of the female part is rendered difficult as, in the case of said known connecting pipe parts, there are provided support members in the form of disk-shaped parts of substantially the same thickness extending in an inclined direction toward the open top side of the female part. This entails that, when inserting a closet bowl outlet, said support members may cause difficult fitting of the closet bowl outlet or may cause the connecting pipe part to be placed incorrectly on the outlet of a closet bowl. In addition, improperly shaped support members can easily move upwards, as a result of which the outlet is pushed out of the female part.

SUMMARY OF THE INVENTION

It is therefore a primary object of the present invention to provide a connecting pipe part which does not present the aforesaid drawbacks.

This object is attained according to the invention in that at least one, preferably discontinuously, thinned flexible transition is provided between the sealing sleeve and the female part.

Thus the sealing sleeve is fastened in a more flexible manner relative to the female part, so facilitating the penetration of an outlet of a closet bowl and providing a reliable seal under all conditions.

Effectively, said transition is in a plane parallel to the inner wall of the female part, which plane lies between the inner side of the female part and the extension of the inner side of the male part.

Preferably, if present, the support members comprise at least one end part extending in the direction of the male part.

This will enable the support members to easily produce a centering effect upon the closet bowl outlet penetrating into the female part.

Quite advantageously, the support members are provided with end parts being thinner than the remaining parts, whereby penetration of a closet bowl outlet is still further considerably facilitated without decreasing the sealing qualities of the sealing sleeve.

The support members appropriately comprise end parts extending substantially parallel to the inner wall of the female part, thus causing a closet bowl outlet to be easily inserted into the female part.

The end portion of a support member conveniently merges via a rounded portion, into the remaining part of the support member, which results in the advantage that these support members can be easily formed in an injection-molding process.

Effectively, the remaining parts of a support member extend substantially radially in relation to the female part.

In a very preferred embodiment, the sealing sleeve is formed to be thinner from the point of the, preferably discontinuously, thinned flexible transition of the female part. Such an embodiment affords obtaining a rigid female part on the one hand and a very flexible sealing sleeve contributing to optimum sealing on the other.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE PREFERRED EMBODIMENTS

Figure 1:
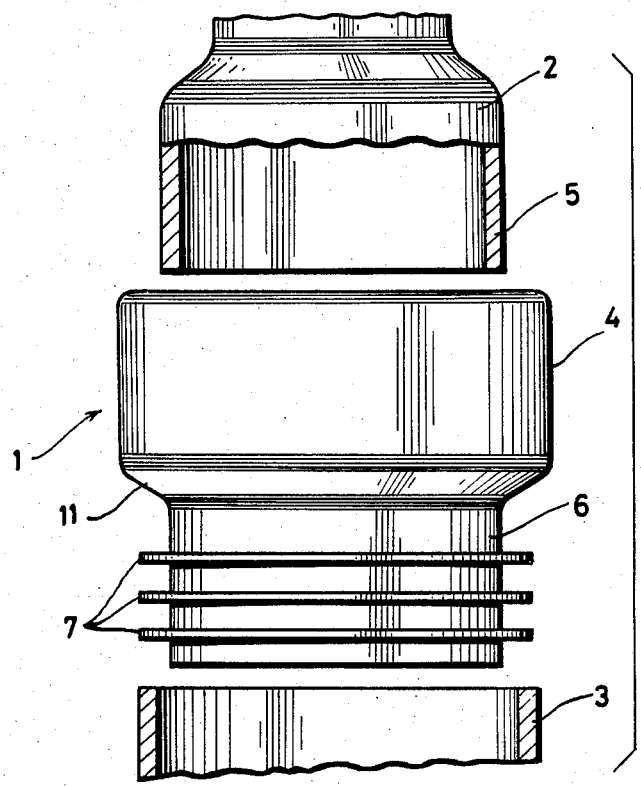
FIG. 1 is a view of a connecting pipe part according to the invention.

FIG. 1 shows a connecting pipe part 1 consisting of a resilient plastic material, such as polyethylene, for connecting a closet bowl 2 to a drain conduit 3 and comprising on one end a female part 4 for receiving an outlet 5 of a closet bowl 2 and, on the other end, a male part 6 adapted to be received into a drain pipe or drain conduit 1. To ensure proper sealing, the male part carries, on its outerside, circumferential flanges 7 of a flexible material, usually of the same material as the connecting pipe part proper, so, for instance, polyethylene.

A sealing sleeve 8 connected with the female part extends within the female part 4.

The inner side 9 of the female part 4 is provided with flexible support members 10, which, when a closet bowl has been properly connected, extend substantially to the sealing sleeve 8. Said sealing sleeve 8 has a length such that it extends substantially to a transition part 11 which interconnects the female part and the male part.

Figure 2:
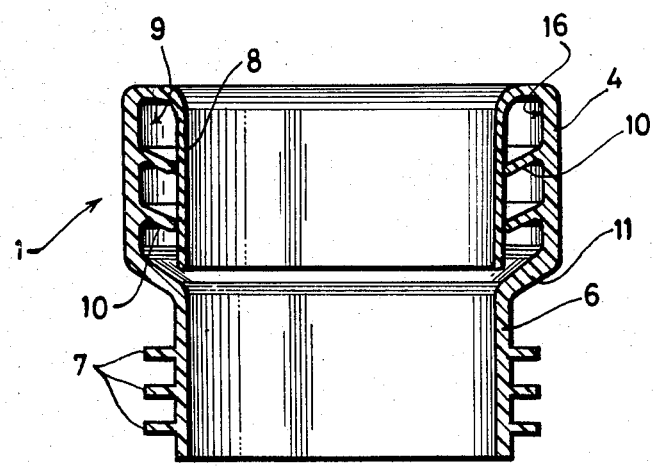
FIG. 2 is a longitudinal sectional view of a first embodiment of a connecting pipe part according to the invention.

Relating now to FIG. 2, the support members 10 in the form of flexible flanges, extend toward the inner side of the male part 6.

This already affords an easy inserting of an outlet 5 of a closet bowl 2 into a female part.

Figure 3:
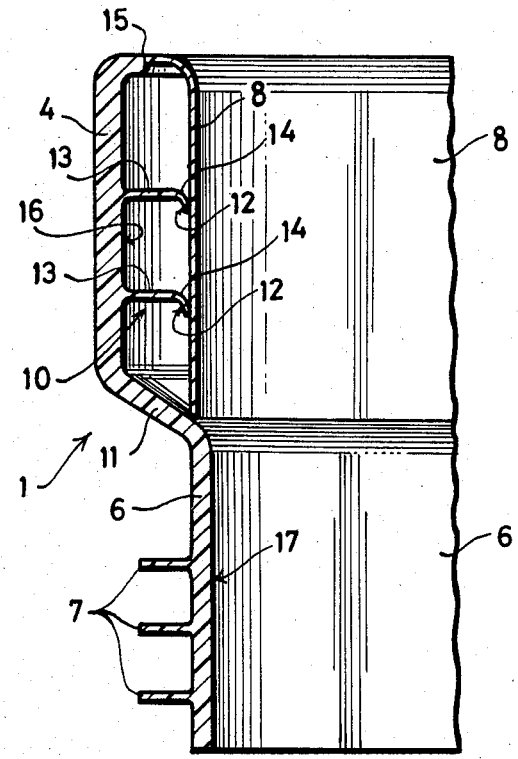
FIG. 3 is a longitudinal sectional view of a modified embodiment of a connecting pipe part according to the invention.

FIG. 3 illustrates an advantageous embodiment wherein the support members 10 have end parts 12 which are thinner than the remaining parts 13 of the support members 10. Due to the thinner form of the end parts 12, they are more flexible and so afford easier penetration of an outlet 5 of a closet bowl into the sealing sleeve 8.

The end parts 12 of the support members 10 extend substantially parallel to the inner side of the female part 4.

Via a rounded portion 14, the end parts 12 effectively merge into the remaining parts 13 of the support member 10. The parts 13 of the support members 10 are disposed mainly in radial direction relative to the female part.

In any event, it must be ensured that the support members comprise end parts directed toward the inside of the male part so as to enable an easier penetration of an outlet of a closet bowl.

Figure 4:
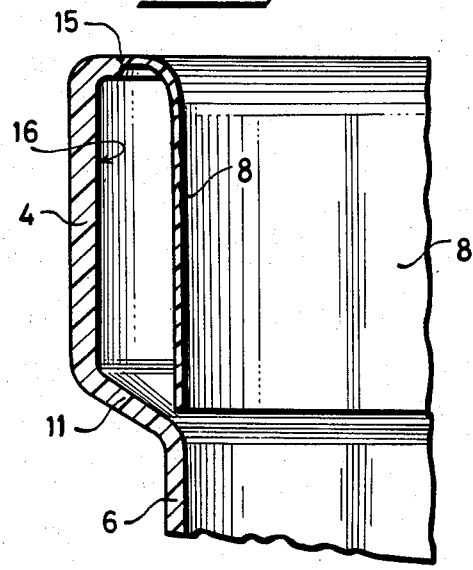
FIG. 4 is an additional modified embodiment according to the invention wherein the female part is shown only.

FIG. 4 shows an embodiment, wherein the connecting part does not carry any support members on the inner side of the female part. It will be evident, however, that such support members may certainly be provided in the form as described hereinbefore.

It is a characteristic feature of this embodiment that the sealing sleeve is at least provided with a transition 15 between the sealing sleeve 8 and the female part 4.

Said transition is at the same time a flexible transition and is produced by giving the transition 15 a reduced wall thickness.

Very advantageously, the transition is located in a plane parallel to the inner wall 16 of the female part 4, which plane lies between the inner side of the female part and the extension of the inner face 17 of the male part 6.

Thus, a very flexible connection between the female part and the sealing sleeve 8 is obtained.

From the point of the transition on, the sealing sleeve is quite advantageously formed to be thinner than the female part. Consequently, the sealing sleeve is very strongly deformable in relation to the female part, which results in optimum sealing.

The transition 15 is preferably located midway between the inner face 16 of the female part and the extension of the inner face 17 of the male part.

For the sake of completeness it is to be noted that, from the point of the transition 15 on, the sealing sleeve has all-along at least the same thickness, preferably a thickness equal to the thickness of the flexible transition.

By using the support members with at least an end portion extending in the direction of the male part 6, an extremely effective sucking seal is obtained in relation to the outlet 5.

Sealing sleeve 8, when properly connected in place, preferably lies in the extension of the male part 6, whereby a very good flow through the closet socket is obtained.

By having the sealing sleeve 8 extend approximately down to the male part, thus giving it a considerable length, there is finally obtained a large contact surface between the outlet stump of the closet bowl and the closet socket.

What is claimed is:

1. A connecting pipe part of a resilient material adapted to connect a closet bowl to a drain conduit and comprising on one end a female part for receiving an outlet of a closet bowl and on the other end a male part adapted to be received into a drain pipe or conduit, a sealing sleeve connected with the female part extending within the female part, the inner side of the female part being provided with flexible support members which extend substantially to the sealing sleeve, said support members comprising end parts extending substantially parallel to the inner side of the female part, as well as said sleeve, and merging through rounded portions into remaining flange like parts of the support members, said flange like parts, extending substantially radially with respect to the female part, said end parts being thinner than the flange like parts.

2. A connecting pipe part according to claim 1, wherein at least one, thinned flexible transition is provided between the sealing sleeve and the female part.

3. The connecting pipe part of claim 2, in which the transition is in a plane parallel to the inner wall of the female part, said plane being located between the inner side of the female part and the extension of the inner side of the male part.

4. The connecting pipe part of claim 2, in which from the point of transition on, the sealing sleeve is thinner than the female part.

5. The connecting pipe part of claim 2, in which the transition is located in a plane parallel to the inner wall of the female part, said plane being located substantially midway between the inner side of the female part and the extension of the inner side of the male part.

* * * * *